United States Patent [19]

Katz et al.

[11] Patent Number: 5,026,765
[45] Date of Patent: Jun. 25, 1991

[54] EMULSION BINDER FOR CARPET AND CARPET TILES

[75] Inventors: Howard G. Katz, Hightstown, N.J.; David Lunsford, Simpsonville, S.C.; Paul R. Mudge, Belle Mead, N.J.

[73] Assignee: National Starch and Chemical Investment Holding Corporation, Wilmington, Del.

[21] Appl. No.: 451,843

[22] Filed: Dec. 15, 1989

[51] Int. Cl.$^5$ ............................................... C08L 33/06
[52] U.S. Cl. ....................................... 524/561; 524/562; 524/564; 524/565; 524/566
[58] Field of Search .................... 524/561, 562, 564

[56] References Cited

U.S. PATENT DOCUMENTS

| | | | |
|---|---|---|---|
| 2,508,341 | 5/1950 | Wilson . | |
| 2,703,794 | 3/1955 | Roedel | 260/87.3 |
| 3,337,482 | 8/1967 | Watanabe et al. | 524/564 X |
| 3,404,112 | 10/1968 | Lindemann et al. | 260/29.6 |
| 3,632,535 | 1/1972 | Gramera et al. | 260/17.4 |
| 3,644,262 | 2/1972 | Stehle et al. | 260/29.6 R |
| 3,652,480 | 3/1972 | Coker | 260/29.6 TA |
| 3,661,696 | 5/1972 | Knutson | 161/204 |
| 3,679,469 | 7/1972 | Moore | 117/161 UZ |
| 3,692,723 | 9/1972 | Kasagi et al. | 260/29.6 E |
| 3,716,504 | 2/1973 | Lindemann et al. | 260/8 |
| 3,739,567 | 6/1973 | Williamson | 57/153 |
| 3,755,237 | 8/1973 | Isaacs et al. | 524/564 X |
| 3,779,799 | 12/1973 | Kennedy et al. | 117/161 UZ |
| 3,779,992 | 12/1973 | Liu | 260/63 UY |
| 4,010,302 | 3/1977 | Anderson et al. | 428/95 |
| 4,035,329 | 7/1977 | Wiest et al. | 260/29.6 T |
| 4,043,961 | 8/1977 | Beresniewicz et al. | 260/29.6 WA |
| 4,239,563 | 12/1980 | Iacoviello | 156/72 |
| 4,243,568 | 1/1981 | Brown | 524/562 |
| 4,263,196 | 4/1981 | Schumacher et al. | 524/562 X |
| 4,395,499 | 7/1983 | Rosenski et al. | 524/564 X |
| 4,397,900 | 8/1983 | Higgins | 428/95 |
| 4,537,926 | 8/1985 | Kivel et al. | 524/564 X |
| 4,595,617 | 6/1986 | Bogdany | 428/95 |
| 4,634,727 | 1/1987 | Kamikaseda et al. | 524/564 X |

OTHER PUBLICATIONS

Back Coatings for Carpets, Vinamul 3240 and Vinamul 3252.

Primary Examiner—Joseph L. Schofer
Assistant Examiner—J. M. Reddick
Attorney, Agent, or Firm—Edwin M. Szala; Ellen T. Dec

[57] ABSTRACT

Carpet coating compositions are disclosed which comprise 40 to 80 percent by weight filler and 20 to 60 percent by weight of a latex binder, the binder comprising an emulsion polymer of
a) 40 to 80% by weight of a vinyl ester of an alkomoic acid, the acid having from 1 to 13 carbon atoms;
b) 5 to 25% by weight of a copolymerizable comonomer having a Tg of at least 50° C.; and;
c) 10 to 30% ethylene.

4 Claims, No Drawings

EMULSION BINDER FOR CARPET AND CARPET TILES

BACKGROUND OF THE INVENTION

Most conventional carpets comprise a primary backing with yarn tufts in the form of cut or uncut loops extending upwardly from the backing to form a pile surface. In the case of tufted carpets, the yarn is inserted into a primary backing by tufting needles and a pre-coat or binder applied thereto. In the case of non-tufted on bonded pile carpets, the fibers are embedded and actually held in place by the binder composition.

In both cases, the carpet construction also usually includes a secondary backing bonded to the primary backing. The secondary backing provides extra padding to the carpet, absorbs noise, adds dimensional stability and often functions as a heat insulator. The secondary backing typically either a woven fabric such as jute or a foam sheet, is laminated to the primary backing by a binder composition or by an adhesive layer applied to the tuft-lock coated primary backing.

Similar techniques are used in the preparation of continuous (rolled) as well as carpet tiles with the major difference being a higher degree of rigidity, often achieved by changes in the structure or composition of the secondary backing.

Generally these applications require a high degree of water resistance, a requirement which is usually met by the use of plastisol or addition of hot melt adhesive to the primary and/or secondary backings. However environmental and safety concerns, particularly in the industrial and institutional areas where carpet tiles containing high levels of plastisol predominate, have led to the development of stringent flame and smoke retardant standards. Moreover, the use of plastisol places a further requirement on the binder utilized in the primary coating that the binder comprise a composition onto which the plastisol will have good adhesion.

Thus, the physical properties of the binder are highly important to successful utilization as a carpet backing coating for the present invention. In this regard, there are a number of important requirements which must be met by such a coating. It must be capable of being applied to the carpet and dried using the processes and equipment conventionally employed in the carpet industry for latex coating. It must provide excellent adhesion to the pile fibers to secure them firmly to the backing both in tufted and non-tufted constructions. The coating must also have low smoke density values and high flame retardant properties and must accept a high loading with fillers such as calcium carbonate, clay, aluminum trihydrate, barite, feldspar, etc. Furthermore, the coating must maintain sufficient softness and flexibility, even with high filler loading or at low temperature, to enable the carpet, if prepared in continuous form, to be easily rolled and unrolled during installation and, in the case of carpet tiles that the tile have sufficient rigidity so as to be easily set in place. The softness and flexibility properties will then vary depending on the style of carpet but in all cases, it is important that the carpet will lie flat and not exhibit a tendencey to curl or dome.

The latex binders utilized heretofore have been lacking in at least one of these critical areas. Thus, highly filled styrene butadiene systems suffer with respect to their poor adhesion to plastisol and exhibit a high degree of smoke generation; ethylene-vinyl chloride-vinyl acetate binders do not pass the most stringent smoke generation tests while low Tg ethylene vinyl acetate systems do not have adequate strength or tuft binding properties.

It is therefore an object of the present invention to provide an economical latex binder for carpets and carpet tiles characterized by a superior balance of adhesion to plastisol, low smoke generation, high flame retardance and dry and wet tuft bind strength. Further, the latex binder must be able to accept and permanently adhere to a secondary backing such as PVC plastisol, hot melt adhesive, woven fabric, as a foam or solid film or another backing composition.

SUMMARY OF THE INVENTION

We have now found that emulsion polymers prepared from ethylene, a vinyl ester and a copolymerizable comonomer having a Tg greater than or equal to 50° C., provide superior binders for use in carpet backings, particularly for use in carpet backed with polyvinyl chloride plastisol.

The present invention is therefore directed to emulsion binders comprising:
a) 40 to 80% by weight of a vinyl ester of an alkanoic acid, the acid having from 1 to 13 carbon atoms;
b) 5 to 25% by weight of a copolymerizable comonomer having a Tg of at least 50° C. and
c) 10 to 30% ethylene.

The resultant emulsion binders are then formulated into primary carpet coatings comprising 20 to 70 percent by weight of the latex binder and 80 to 30 percent by weight filler.

The coatings of the present invention are advantageously utilized in the production of either conventional tufted or non tufted carpet and dried using equipment which is readily available in most carpet mills. Thus, the coatings are useful in the production of pile carpets comprising a primary backing with pile yarns extending from the primary backing to form pile tufts; as well as non-tufted carpets wherein the fibers are embedded into binder composition which has been coated onto a woven or non-woven substrate. In addition to having excellent fiber bonding characteristics, excellent dry and wet tuft bind properties, and excellent resistance to delamination of the secondary backing, the specific polymer latex also has the desireable good flame retardancy and low smoke properties. In addition, the tuft-lock adhesive coating can be loaded to a high degree with a filler, such as calcium carbonate, clay and aluminum trihydrate, which enhances the flame retardancy and low smoke properties of the carpet without adversely affecting the adhesive properties of the coating. For example, the coating may comprise from about 20 to 70 percent by weight of the polymer latex composition and from about 80 to 30 percent by weight aluminum trihydrate filler.

The present invention also provides a method of preparing a pile or tufted carpet which includes the steps of;
a) tufting or needling the yarn into a woven or non-woven backing;
b) applying a primary carpet coating to the rear of the backing; and
c) drying the resultant carpet construction.

In producing such tufted carpets it is also desirable to apply a secondary backing to the primary backing either before or after drying of the latex coating, depending upon the type of backing employed.

Non-tufted carpets may also be prepared utilizing the latex coating of the invention by a method which comprises the steps of:
a) coating the latex onto a substrate;
b) embedding the carpet fibers therein; and
c) drying.

These non-tufted carpets may also be advantageously prepared utilizing a secondary backing to provide additional dimensional stability.

DETAILED DESCRIPTION OF THE INVENTION

The vinyl esters utilized herein are the esters of alkanoic acids, the acid having from one to about 13 carbon atoms. Typical examples include: vinyl formate, vinyl acetate, vinyl propionate, vinyl butyrate, vinyl isobutyrate, vinyl valerate, vinyl-2-ethyl-hexanoate, vinyl isooctanoate, vinyl nonate, vinyl decanoate, vinyl pivalate, vinyl versatate, etc. Of the foregoing, vinyl acetate is the preferred monomer because of its ready availability and low cost. The vinyl ester is present in the copolymer in amounts of about 40 to 80 by weight, preferably 60 to 70%.

Any copolymerizable comonomer having a Tg of 50° C. or greater may be employed herein. Representative high Tg comonomers include methyl methacrylate, styrene, dimethyl maleate, t-butyl methacrylate, vinyl pivalate, t-butyl isobornyl acrylate, phenyl methacrylate, acrylonitrile. These are generally used at levels of 5 to 25% by weight, preferably 10 to 20%.

The ethylene component is generally added at levels of 10 to 30% by weight, preferably 15 to 25%.

It may also be desired to incorporate in the copolymer minor amounts of one or more functional comonomers. Suitable copolymerizable comonomers include, for example, acrylic and methacrylic acid or the half esters of maleic acid such as monoethyl, monobutyl or monooctyl maleate, acrylamide, tertiary octylacrylamide, N-methylol (meth)acrylamide, N-vinylpyrrolidinone, diallyl adipate, triallyl cyanurate, butanediol diacrylate, allyl methacrylate, etc. as well as $C_2$–$C_3$ hydroxyalkyl esters such as hydroxyethyl acrylate, hydroxy propyl acrylate and corresponding methacrylates. The latter comonomers are generally used at levels of less than about 5%, preferably 0.5 to 2.5%, depending upon the nature of the specific comonomer.

In addition, certain copolymerizable monomers which assist in the stability of the copolymer emulsion, e.g., vinyl sulfonic acid, are also useful herein as latex stabilizers. These optionally present monomers, if employed, are added in very low amounts of from 0.1 to about 2% by weight of the monomer mixture.

The latex binder emulsions are prepared using conventional procedures wherein the vinyl acetate, ethylene, and other comonomers are polymerized in an aqueous medium under pressures not exceeding 100 atmospheres in the presence of a catalyst and at least one emulsifying agent, the aqueous system being maintained by a suitable buffering agent at a pH of 2 to 6, the catalyst being added incrementally or continuously. More specifically, the vinyl acetate and 50 to 75% of the other comonomers are suspended in water and are thoroughly agitated in the presence of ethylene under the working pressure to effect solution of the ethylene in the mixture up to the substantial limit of its solubility under the condition existing in the reaction zone, while the vinyl acetate and high Tg monomer are gradually heated to polymerization temperature. The homogenization period is followed by a polymerization period during which the catalyst, which consists of a main catalyst or initiator, and may include an activator, is added incrementally or continuously together with the remaining comonomers and functional monomers. The monomers employed may be added either as pure monomer or as a premixed emulsion.

Suitable as polymerization catalysts are the water-soluble free-radical-formers generally used in emulsion polymerization, such as hydrogen peroxide, sodium persulfate, potassium persulfate and ammonium persulfate, as well as tert-butyl hydroperoxide, in amounts of between 0.01 and 3% by weight, preferably 0.01 and 1% by weight based on the total amount of the emulsion. They can be used or together with reducing agents such as sodium formaldehyde-sulfoxylate, ferrous salts, sodium dithionite, sodium hydrogen sulfite, sodium sulfite, sodium thiosulfate, as redox catalysts in amounts of 0.01 to 3% by weight, preferably 0.01 to 1% by weight, based on the total amount of the emulsion. The free-radical-formers can be charged in the aqueous emulsifier solution or be added during the polymerization in doses.

The polymerization is carried out at a pH of between 2 and 7, preferably between 3 and 5. In order to maintain the pH range, it may be useful to work in the presence of customary buffer systems, for example, in the presence of alkali metal acetates, alkali metal carbonates, alkali metal phosphates. Polymerization regulators, like mercaptans, aldehydes, chloroform, ethylene chloride and trichloroethylene, can also be added in some cases.

The emulsifying agents are those generally used in emulsion polymerization, as well as optionally present protective colloids. It is also possible to use emulsifiers alone or in mixtures with protective colloids.

The emulsifiers can be anionic, cationic, nonionic surface-active compounds or mixtures thereof. Suitable anionic emulsifiers are, for example, alkyl sulfonates, alkylaryl sulfonates, alkyl sulfates, sulfates of hydroxylalkanols, alkyl and alkylaryl disulfonates, sulfonated fatty acids, sulfates and phosphates of polyethyoxylated alkanols and alkylphenols, as well as esters of sulfosuccinic acid. Suitable cationic emulsifiers are, for example, alkyl quaternary ammonium salts, and alkyl quaternary phosphonium salts. Examples of suitable non-ionic emulsifiers are the addition products of 5 to 50 mols of ethylene oxide adducted to straight-chain and branch-chain alkanols with 6 to 22 carbon atoms, or alkylphenols, or higher fatty acids, or higher fatty acid amides, or primary and secondary higher alkyl amines; as well as block copolymers of propylene oxide with ethylene oxide and mixtures thereof. When combinations of emulsifying agents are used, it is advantageous to use a relatively hydrophobic emulsifying agent in combination with a relatively hydrophilic agent. The amount of emulsifying agent is generally from about 1 to about 10, preferably from about 2 to about 8, weight percent of the monomers used in the polymerization.

The emulsifier used in the polymerization can also be added, in its entirety, to the initial charge to the polymerization zone or a portion of the emulsifier, e.g. from 90 to 25 percent thereof, can be added continuously or intermittently during polymerization.

Various protective colloids may also be used in place of or in addition to the emulsifiers described above.

Suitable colloids include partially acetylated polyvinyl alcohol, e.g., up to 50 percent acetylated, casein, hydroxyethyl starch, carboxyxethyl cellulose, gum arabic, and the like, as known in the art of synthetic emulsion polymer technology. In general, these colloids are used at levels of 0.05 to 4% by weight based on the total emulsion.

The process of making the emulsions generally comprises the preparation of an aqueous solution containing at least some of the emulsifying agent and stabilizer, and the pH buffering system. This aqueous solution and the initial charge of vinyl ester are added to the polymerization vessel and ethylene pressure is applied to the desired value. The quantity of ethylene entering into the copolymer is influenced by the pressure, the agitation, and the viscosity of the polymerization medium. Thus, to increase the ethylene content of the copolymer, higher pressures are employed. A pressure of at least about 10 atmospheres is most suitably employed. As previously mentioned, the mixture is thoroughly agitated to dissolve the ethylene, agitation being continued until substantial equilibrium is achieved. This generally requires about 15 minutes. However, less time may be required depending upon the vessel, the efficiency of agitation, the specific system, and the like. When high ethylene contents are desired, a higher degree of agitation should be employed. In any case, by measuring the pressure drop of the ethylene in conventional manner, the realization of substantial equilibrium can be easily determined. Conveniently the charge is brought to polymerization temperature during this agitation period. Agitation can be effected by shaking, by means of an agitator, or other known mechanism. The polymerization is then initiated by introducing initial amounts of the catalyst, and of the activator when used. After polymerization has started, the catalyst and the activator are incrementally added as required to continue polymerization, and the remainder of the major monomer and any minor functional monomers are similarly added.

Alternatively, the polymers utilized herein may be prepared using a two-stage polymerization procedures generally referred to as producing "core-shell" or "interpenetrating network" type polymers. Such polymerization procedures are described, for example, in U.S. Pat. Nos. 3,671,610; 3,833,404; and 4,616,057, the disclosures of which are incorporated herein by reference. In such cases, an ethylene vinyl acetate polymer is prepared as a first stage using conventional batch, semi-batch or continuous emulsion polymerization procedures such as taught in U.S. Pat. Nos. 2,754,280; 2,795,564 and 3,732,184. The amounts of ethylene and vinyl acetate may vary within a range of about 10 to 25% by weight ethylene and 70 to 90% vinyl acetate with the amounts chosen so as to provide a first-stage polymer having a Tg of −20° to +10° C.

The monomers which comprise the major portion of the second stage copolymer are then selected to have a Tg within the range of 50° to 125° C. and a second stage polymerization is then carried out, again using conventional techniques so as to produce a polymer wherein the ratio of the first stage polymer to the second stage polymer may vary from about 6:1 to 2:1 and is preferably in the range of 3:1.

Regardless of the polymerization procedure used, the reaction is generally continued until the residual vinyl ester monomer content is below about 1%. The completed reaction product is then allowed to cool to about room temperature, while sealed from the atmosphere.

The emulsions are produced and used at relatively high solids content, e.g., between 35 and 70%, preferably not less than 50%, although they may be diluted with water if desired.

The particle size of the latex can be regulated by the quantity of nonionic or anionic emulsifying agent or protective colloid employed. To obtain smaller particle sizes, greater amounts of emulsifying agents are used. As a general rule, the greater the amount of the emulsifying agent employed, the smaller the average particle size.

If desired, conventional additives may be incorporated into the carpet binders of our invention in order to modify the properties thereof. Among these additives may be included fillers, thickeners, catalysts, dispersants, colorants, biocides, anti-foaming agents, etc.

In particular, the ability to load the coating with high amounts of fillers such as clay, calcium carbonate, aluminum trihydrate, barium, feldspar, etc. permits an increase in the superior flame retardancy and low smoke properties the copolymer already has. Preferred coating compositions in accordance with the present invention are loaded with filler to yield a composition ranging from about 20 to 70 percent by weight polymer, and about 80 to 30 percent by weight filler depending, in part, on the type and form of the carpet being constructed.

In preparing a tufted carpet, the yarn is tufted or needled into a primary backing which is generally nonwoven polypropylene, polyethylene or polyester or woven jute or polypropylene. If a secondary backing is used, it is generally formed of woven or non-woven materials similar to those used as the primary backing and applied directly to the wet pre-coated primary backing prior to the drying step or applied with a separater adhesive to the dried pre-coated primary backing. Such a secondary backing provides dimensional stability to the carpet. The secondary backing may also be formed of a foam polymer or copolymer. Suitable foam compositions include urethane polymers, polymers and copolymers of ethylene, propylene, isobutylene, and vinyl chloride. When a foam secondary backing is used, it may be prefoamed and then laminated onto the primary backing, or the composition may contain a thermally activatable blowing agent and may be foamed immediately prior to lamination or after lamination. Additionally, the secondary backing may exhibit thermoplastic adhesive properties of its own, and the secondary backing can be preheated prior to lamination to render the surface thereof adhesive. Alternatively, the secondary backing may comprise a hot melt, one or more or fused polyvinyl chloride plastisol layer(s) or bitumen, often in conjunction with fiberglass scrim or other scrim known to provide dimensional stability. It is also contemplated that the latex binder composition disclosed herein for use as the primary backing may be used as the secondary backing.

In forming a non-tufted carpet, the carpet coating is generally thickened to a viscosity of about 25,000 to 75,000 cps. and applied to a scrim surface. The fibers are then directly embedded into the wet coating using conventional techniques and then dried. Again, a secondary coating similar to that described above is desirably employed.

The coating is easier to apply to the carpet than hot melt thermoplastic adhesives which require expensive and complex machines and processes to apply the coating, and the coating also penetrates the fibers of the carpet yarns to yield better adhesion, fiber bundle integrity and anti-fuzzing properties. Additionally, the coating exhibits particularly excellent tuft-bind properties. The term "tuft-bind" refers to the ability of a the latex coating to lock and secure the pile yarn tufts to the primary backing and is determined by measuring the amount of force required to physically pull a tuft free from the primary backing. Additionally for the purposes herein, tuft-bind is also used to include the superior characteristics needed in non-tufted coatings wherein the adhesion of the fiber pile is achieved solely by the backing. Suitable tuft-bind properties can be achieved by applying an amount of coating ranging from about 12 ounces per square yard to about 32 ounces per square yard (dry basis), which results in a carpet having a tuft-bind value of at least 10 pounds force, and in many instances a tuft-bind value of 15 pounds force or greater.

EXAMPLES

A latex emulsion useful in the production of the carpet coatings of the invention was prepared by as follows:

A 10 liter stainless steel autoclave equipped with heating/cooling means, variable rate stirrer and means of metering monomers and initiators was employed. To the 10 liter autoclave was charged 200 g (of a 20% w/w solution in water) sodium alkyl aryl polyethylene oxide sulphate (3 moles ethylene oxide), 25 g (of a 70% w/w solution in water) alkyl aryl polyethylene oxide (30 mole ethylene oxide), 30 g (of a 25% w/w solution in water) sodium vinyl sulphonate, 2 g sodium fomaldehyde sulphoxylate, 0.5 sodium acetate, 5 g (of a 1% solution in water) ferrous sulphate solution in 990 g water. After purging with nitrogen, 2000 g vinyl acetate and 3.0 g triallyl cyanurate were added and the reactor was pressurized to 600 psi with ethylene and equilibrated at 50° C. for 15 minutes.

The polymerization was started by simultaneously metering in solutions of 37.5 g (of a 70% w/w solution in water) tertiary butyl hydroperoxide in 175 g of water and 30 g sodium formaldehyde sulphoxylate and 0.5 g sodium acetate in 175 g of water. The initiators were added at a uniform rate over a period of 5 hours.

After initiation (2° C. increase in contents temperature), a mixture of 550 g vinyl acetate, 450 g methyl methacrylate, 90 g N-xethylol acrylamide (48% w/w solution in water) in a solution of 100 g (of a 20% w/w solution in water) sodium alkyl aryl polyethylene oxide sulphate (3 mole ethylene oxide), and 25 g (of a 70% w/w solution in water) alkyl aryl polyethylene oxide (30 mole ethylene oxide) in 200 g water was added at a uniform rate over a period of 4 hours. At this point, the contents temperature was increased to 82° C. and maintained until the polymerization was complete. At the end of the initiator slow additions, the reaction contents were transferred to a holding tank and degassed of residual ethylene. To the holding tank was charged 2 g (of a 70% w/w solution in water) tertiary butyl hydroperoxide in 20 g water. After 15 minutes, 2 g of sodium formaldehyde sulfoxylate in 20 g water was also added. After this procedure the internal temperature was cooled to 25°-30° C. and discharged.

The resultant emulsion polymer, designated Emulsion 2, contained 72.25 parts vinyl acetate, 15 parts ethylene, 12.5 parts methyl methacrylate, 1.5 parts N-methyhol acrylamide and 0.1 parts triallyl cyanaurate.

Using a similar procedure, other latex emulsions were prepared varying the monomers and relative amounts. The resultant emulsions designated Emulsions 1-7,11,13,14 and 16, all of which have Tg values above 0° C., are described in Table I.

Emulsion 8, was prepared using the following two stage polymerization procedure:

The base (first-step) ethylene vinyl acetate latex was prepared as in the procedure above but substituting the methyl methacrylate with vinyl acetate.

In the second state, a 10 liter stainless steel autoclave reaction vessel equipped with heating/cooling means variable rate stirrer and mean of metering xonomers and initiators was employed. To the 10 liter reactor containing 5132 g (of a 62.4% w/w solids in water) alkyl aryl polyethylene oxide (30 moles ethylene oxide) in 950 g water. After purging with nitrogen, the contents temperature was raised to 60° C. The second-stage polymerization was initiated by separately and simultaneously adding a mixture of 640.5 g methyl methcarylate, 19.2 g isobutoxy methacrylamide and 3.2 g triallyl cyanurate accompanied by 7.7 g (of a 70% solution in water) tertiary butyl hydroperoxide in 128 g water and 5.1 g sodium formaldehyde sulfoxylate and 1.3 g sodium acetate in 128 g water. The monomer mixture and the initiator solutions were added at a uniform rate over a period of 1½ and 2 hours respectively. The contents temperature was maintained at 60° C. until the polymerization was complete. At the end of the initiator slow additions the reactor contents was cooled to 25°-30° C. and discharged.

A similar procedure was used to prepare emulsion 9 and 15. All these Emulsions had Tg values above 0° C.

TESTING

In order to evaluate the properties of the emulsions in carpet coatings, Emulsions 1-16 were formulated at 70 to 72% solids levels, coated or carpet and tested as follows:

Formulation (by dry parts)

| Ingredients | Pts by Wt. |
| --- | --- |
| Polymer | 100.00 |
| Polyacrylate dispersant (optional, as needed) | 0.25 |
| Ammonium chloride | 1.00 |
| Alumina Trihydrate Filler | 154.00 |
| Ammonium Hydroxide (26%) | as needed for pH = 7.0–8.0 |
| Cellulosic Thickener | 0.5–1.5* |

*as needed for viscosity = 2000-3000 cps (#4/20 rpm) Brookfield RVT

Coating Procedure

The compounds were scrap coated onto the back of a 28 oz/yd² commercially supplied cut pile carpet. The coated carpet samples were dried for 5 minutes at 260° F. and cured for 5 minutes at 300° F. Samples were then coated with a typical polyvinyl chloride plastisol compound and cured for 7 minutes at 300° F. Samples were placed in a constant climate room overnight prior to testing.

Tuft Bind Value

This test measures the durability and wear resistance properties of the carpet by determining the amount of force (in lbs) required to pull a loop or one leg of a loop through the backing. Since all of our testing was done on cut pile carpet, a Kelly clamp was used to hold a single tuft. The Kelly clamp was then secured in the top jaw of the Instron and the carpet in the bottom jaw. Testing was done at a speed of 12 inches/min. using a 100 lb. cell. Dry tuft bind values were conducted after conditioning the samples for at least 12 hrs at 72° F. and 65% relative humidity. Wet tuft bind values were conducted on samples which had been completely immersed in water at room temperature for 2 hrs.

Adhesion Properties

Testing was done to determine the adhesive strength between the precoat and PVCL plastisol. Testing was done by applying about 100 mils of liquid PVCL plastisol to the precoat carpet and heated for 7 minutes at 300° F. in order to obtain a fused PVCL plastisol. Coated samples were tested for adhesion after 24 hrs. @160° F. and 1 week @160° F. The one week reading gives an indication of the effect of plasticizer migration on adhesion properties.

The results of the testing are shown in Table I.

TABLE I

| Emulsion | Composition (parts by weight) | Tuft Bind Dry | Wet | Adhesion 24 Hrs | 1 Week |
|---|---|---|---|---|---|
| 1 | 76.5 VA/15E/8.5 MMA/1.5 NMA/0.1 TAC | 13.2 | 7.8 | V.G. | V.G. |
| 2 | 72.25 VA/15E/12.75 MMA/1.5 NMA/0.1 TAC | 13.2 | 6.0 | V.G. | V.G. |
| 3 | 68 VA/15E/17 MMA/1.5 NMA/0.1 TAC | 14.2 | 10.2 | V.G. | V.G. |
| 4 | 68 VA/15E/17 MMA/2.25 NMA/0.1 TAC | 15.1 | 10.1 | V.G. | V.G. |
| 5 | 68 VA/15E/17 NMA/3.0 NMA/0.1 TAC | 14.4 | 9.9 | V.G. | V.G. |
| 6 | 68 VA/15E/17 MMA/3.0 NMA/0.1 TAC/1.5 AA | 14.6 | 7.9 | V.G. | V.G. |
| 7 | 68 VA/15E/17 MMA/3.0 NMA/0.1 TAC/3.0 MIBM | 13.8 | 8.8 | V.G. | V.G. |
| 8 | 66 VA/17E/17 MMA/1.2 NMA/0.2 TAC/0.5 IBMA | 12.8 | 8.0 | V.G. | V.G. |
| 9 | 62 VA/15E/23 MMA/1.2 NMA/0.2 TAC/0.7 IBMA | 15.4 | 10.9 | V.G. | V.G. |
| 10 | EVA/NMA commercial control having a Tg >0° C. | 10.6 | 7.8 | V.G. | V.G. |
| 11 | 72 VA/10E/18 MMA/2.25 NMA/0.1 TAC | 14.7 | 9.1 | V.G. | V.G. |
| 12 | Polyvinylidene chloride acrylate (no MNA) commercial control having a Tg <0° C. | 12.0 | 5.9 | Good | Fair |
| 13 | 68 VA/15E/17 MMA/0.1 TAC | 9.7 | 4.2 | V.G. | V.G. |
| 14 | 64 VA/16E/20 Styrene/1.2 NMA/0.2 TAC/0.6 IBMA | 13.8 | 8.0 | Good | Good |
| 15* | 56 VA/14E/30 Styrene/1.0 NMA/0.25 TAC/0.9 IBMA | 15.4 | 10.4 | Good | Good |
| 16 | 56 VA/14E/30 DMM/1.6 NMA/0.1 TAC | 13.1 | 8.5 | V.G. | V.G. |

Key
VA = Vinyl acetate
E = Ethylene
MMA = Methyl methyl acrylate
NMA = N-methylol acrylamide
TAC = Triallyl cyanurate
IBMA = Iso-butoxyl methacrylamide
DMM = Dimethyl maleate
AA = Acrylic acid
MIBM = Mono-isobutyl maleate As is readily apparent, carpet produced utilizing the latex emulsion of the invention results in a product having superior performance properties as demonstrated by the high tuft bind and excellent adhesion values.

In particular, it is noted that the addition to the emulsion polymer of the high Tg comonomer substantially improves the tuft bind properties, especially the dried tuft bind properties, of the backed carpets. It is further noted that although the values achieved utilizing Emulsion 13, which contained no N-methylol acrylamide, were not as high as those of the NMA-containing control, the dry values (9.7) were approximately equivalent to those of the control (10.6) and the overall performance was acceptable for use in those applications where formaldehyde free systems, such as those containing NMA, cannot be utilized. Additionally, the resultant carpets exhibited excellent flame retardancy properties and low smoke density values.

What is claimed:

1. Carpet coating compositions comprising 30 to 80 percent by weight filler and 20 to 70 percent by weight of a latex binder, the binder comprising an polymer of:
   a) 40 to 80% by weight of a vinyl ester of an alkanoic acid, the acid having from 1 to 13 carbon atoms;
   b) 5 to 25% by weight of a copolymerizable comonomer having a Tg of at least 50° C., and;
   c) 10 to 30% ethylene said polymer made by an emulsion polymerization procedure.

2. The carpet coating of claim 1 wherein the vinyl ester is vinyl acetate.

3. The carpet coating of claim 1 wherein the copolymerizable comonomer having a Tg of 50° C. or greater is selected from the group consisting of methyl methacrylate, styrene, dimethyl maleate, t-butyl methacrylate, vinyl pivalate, t-butyl isobornyl acrylate, phenyl methacrylate, and acrylonitrile.

4. The carpet coating of claim 1 wherein the high Tg copolymerizable comonomer is present at levels of 10 to 20% by weight of the polymer.

* * * * *